US00RE37398B1

(19) United States
(12) Reissued Patent
Nageno

(10) Patent Number: US RE37,398 E
(45) Date of Reissued Patent: Oct. 2, 2001

(54) HEADPHONE

(75) Inventor: Koji Nageno, Tokyo (JP)

(73) Assignee: Sony Corporation, Tokyo (JP)

(21) Appl. No.: 09/033,837

(22) Filed: Mar. 3, 1998

Related U.S. Patent Documents

Reissue of:
(64) Patent No.: 5,497,427
Issued: Mar. 5, 1996
Appl. No.: 08/351,738
Filed: Dec. 8, 1994

U.S. Applications:

(63) Continuation of application No. 08/122,309, filed on Sep. 17, 1993.

(30) Foreign Application Priority Data

Sep. 25, 1992 (JP) ..... 4-280635

(51) Int. Cl.[7] ..... H04R 25/00
(52) U.S. Cl. ..... 381/371; 381/370; 381/373
(58) Field of Search ..... 381/309, 71.6, 381/72, 74, 370, 371, 373, 372, FOR 149, FOR 150; 181/128, 129; 379/430

(56) References Cited

U.S. PATENT DOCUMENTS

| | | | | |
|---|---|---|---|---|
| 3,661,225 | * | 5/1972 | Anderson | 181/129 |
| 3,798,393 | * | 3/1974 | Gorike . | |
| 4,005,278 | * | 1/1977 | Gorike | 381/371 |
| 4,027,116 | * | 5/1977 | Nakamura . | |
| 4,041,256 | * | 8/1977 | Ohta et al. | 381/371 |
| 4,160,135 | * | 7/1979 | Gorike . | |
| 4,742,887 | * | 5/1988 | Yamagishi | 381/372 |
| 4,924,502 | * | 5/1990 | Allen et al. . | |
| 4,958,697 | * | 9/1990 | Moody . | |
| 5,208,868 | * | 5/1993 | Sapiejewski | 381/372 |

FOREIGN PATENT DOCUMENTS

| | | | |
|---|---|---|---|
| 2547925 | | 5/1976 | (DE) . |
| 2908326 | * | 9/1979 | (DE) . |

* cited by examiner

*Primary Examiner*—Huyen Le
(74) *Attorney, Agent, or Firm*—Jay H. Maioli

(57) ABSTRACT

A headphone in which a housing containing a drive unit is provided with a window hole formed therein and the window hole is covered with a diaphragm providing acoustic transmissibility therethrough.

5 Claims, 8 Drawing Sheets

TRANSMISSION CHARACTERISTICS (FREQUENCY-SOUND PRESSURE CHARACTERISTICS) OF EXTERNAL SOUND

REPRODUCED SOUND CHARACTERISTICS (FREQUENCY–SOUND PRESSURE CHARACTERISTICS)

HEADPHONE

Matter enclosed in heavy brackets [ ] appears in the original patent but forms no part of this reissue specification; matter printed in italics indicates the additions made by reissue.

This is a continuation of application Ser. No. 08/122,309 filed Sep. 17, 1993, *abandoned*.

BACKGROUND OF THE INVENTION

1. Field of the Invention

The present invention relates to a headphone and more particularly to a headphone provided with a housing containing a drive unit and adapted to reproduce sound by means of the drive unit.

2. Description of the Related Art

The headphone is used for personally enjoying reproduced sound of music and the like. Such headphones are generally divided into two types: open-air type and closed type.

The headphone of the open-air type has a permeable ear pad and has the housing containing the drive unit and provided with a through hole formed therein. Therefore, when a listener wears the headphone to listen to a reproduced sound, the sound produced within the housing easily leaks out and also sound from the outside can be heard by the listener. While the headphone of the open-air type has acoustic transmissibility between inside and outside the housing and, hence, it allows the sound to be heard as a natural sound, the sound is greatly attenuated in the low-pitched sound range below f0 (the lowest resonance frequency) and tends to lack the low-pitched sound component.

On the other hand, the closed type headphone has the housing containing the drive unit closed and has the ear pad keeping sound from leaking out. Although a rich sound characteristic in the low-pitched sound range can be obtained from the closed type, it is difficult to obtain a natural sound from this type.

SUMMARY OF THE INVENTION

Accordingly, an object of the present invention is to provide a headphone capable of obtaining both the merit of the open-air type headphone introducing the external sound therein thereby providing a refreshing sound and the merit of the closed type headphone having a rich sound characteristic extended over the low-pitched sound range.

A headphone according to the present invention is structured such that a window hole is formed in the housing containing a drive unit and the window hole is covered with a diaphragm, so that the external sound is transmissible through the window hole, and hence a listener putting on this headphone can hear the external sound while the reproduced sound in the low-pitched sound range below f0 is not attenuated. Thus, the listener can perceive a refreshing and natural sound.

Further, since the window hole is adapted to be shut when necessary, the headphone can be used also as that of closed type by shutting the window hole.

DESCRIPTION OF THE PREFERRED EMBODIMENTS

Figure 1:
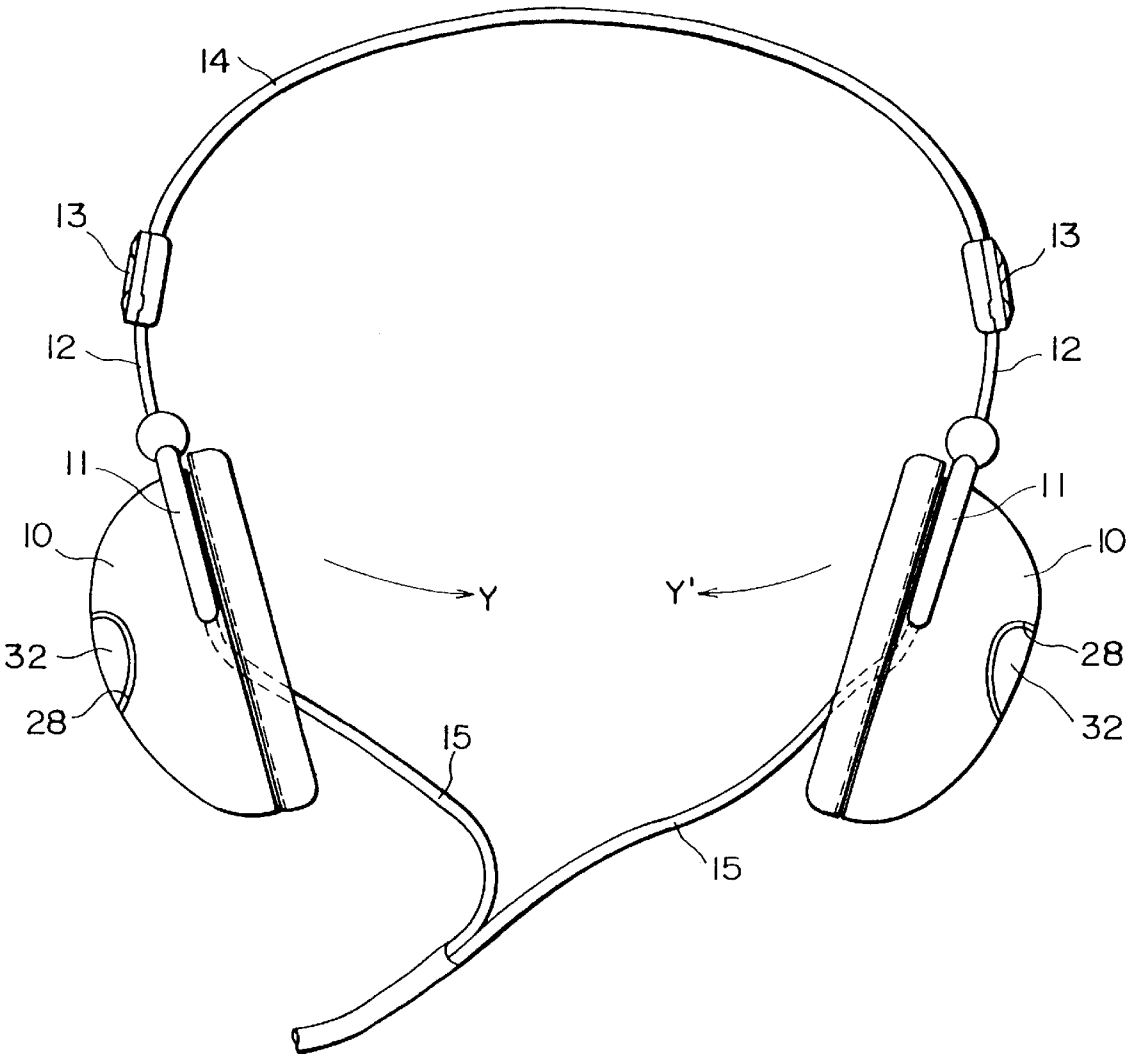
FIG. 1 is a front view of an overall structure of an embodiment of the invention.
Figure 2:
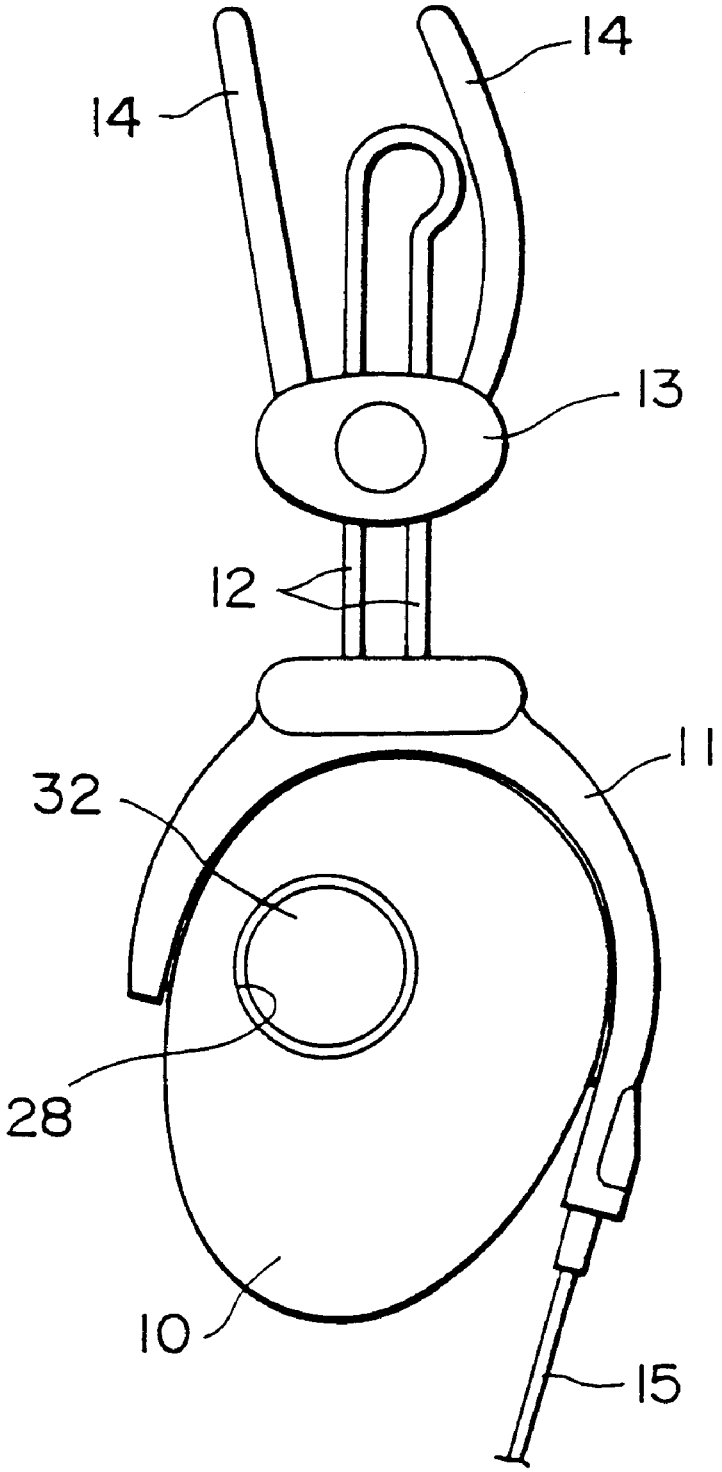
FIG. 2 is a side view of an overall structure of the embodiment of the invention.

FIG. 1 to FIG. 5 show a stereo headphone according to an embodiment of the invention. The headphone has a pair of housings 10 for the left and right ears as shown in FIG. 1. As shown in FIG. 1 and FIG. 2, each housing 10 has a form as obtained by longitudinally dividing an egg in two. The housing 10 is supported by a hanger 11 for rotation about its support shaft. The hanger 11 is provided with a slide arm 12 in the shape of the inverted letter U.

The slide arm 12 is slidably coupled to a supporting member 13. The supporting members 13 on both left and right sides are coupled by a head band 14. The head band 14 is provided with a resilient force biasing the same inwardly as indicated by arrows Y and Y' and, hence, when the headphone is put on the head, each of the housings 10 is resiliently pushed against each ear. From the housings 10, cords 15 are led out and the other ends of the cords 15 are adapted to be connected to an apparatus such as a radio receiver or a tape recorder. Through the cords 15, a sound signal from the radio receiver or tape recorder is supplied to a coil for the drive unit within the housing 10.

An example of structure of a housing 10 for the right ear will be described below with reference to FIG. 3, FIG. 4, and FIG. 5.

Figure 3:
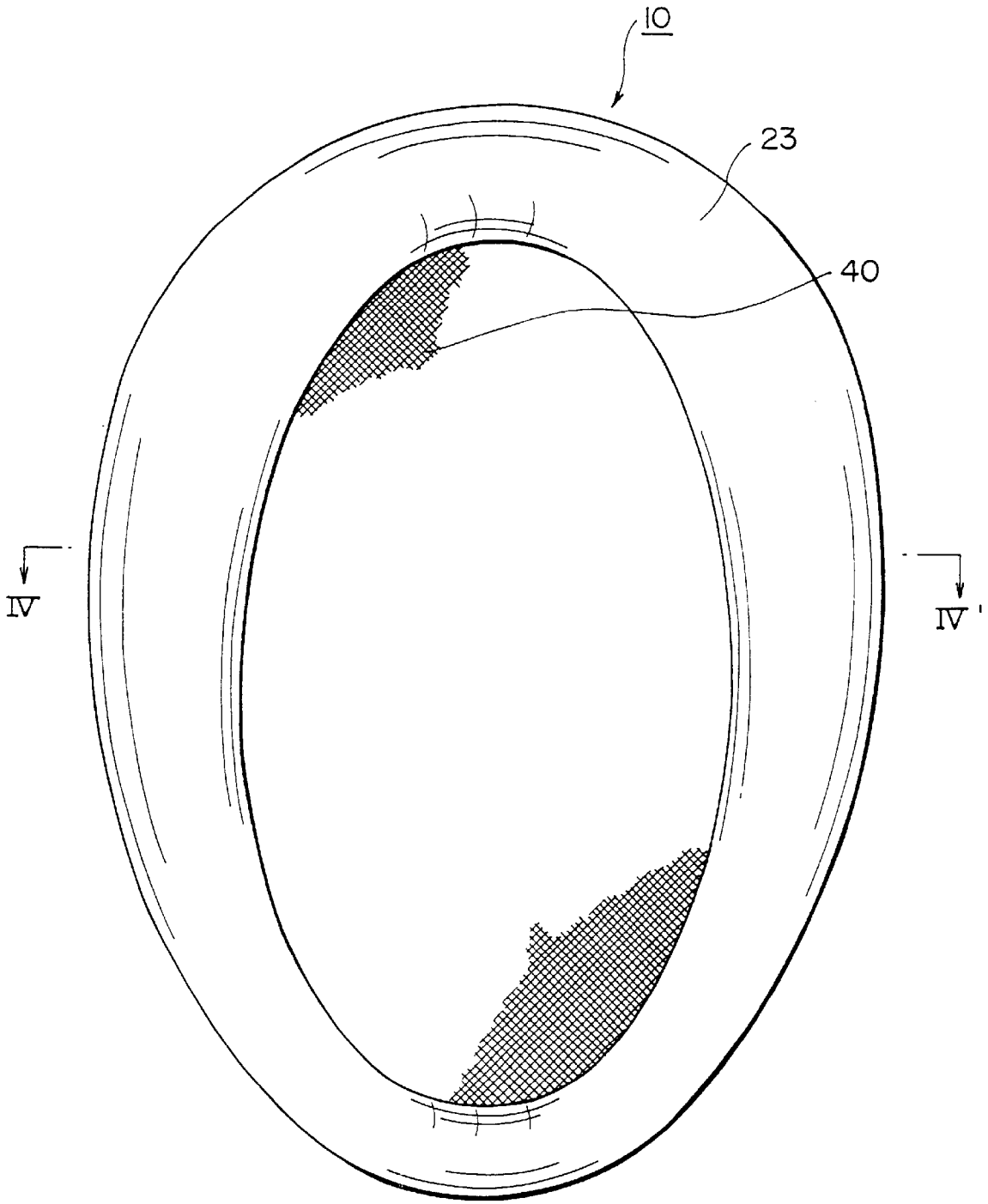
FIG. 3 is a side view, with the principal portion enlarged, of the embodiment of the invention.
Figure 4:
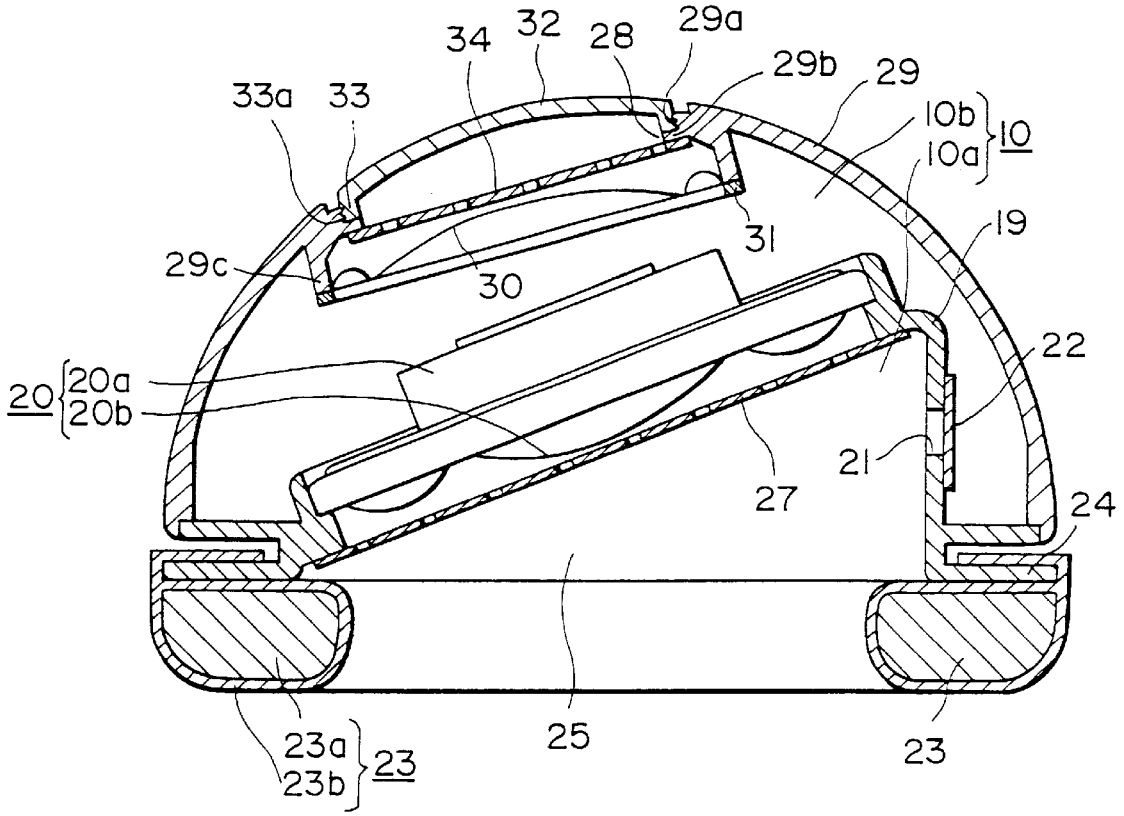
FIG. 4 is a sectional view taken along section line IV—IV of FIG. 3.
Figure 5:
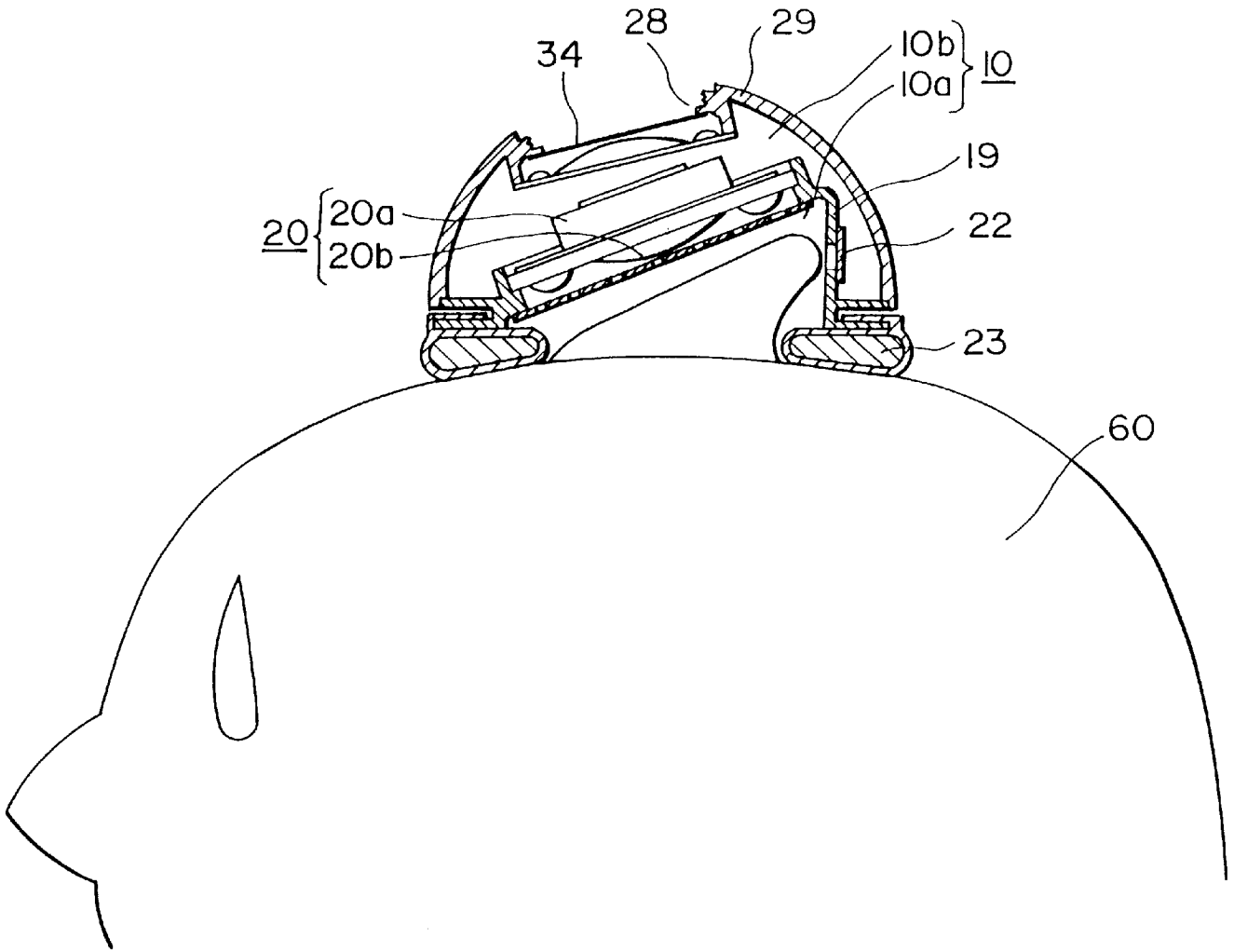
FIG. 5 is a sectional view of the embodiment of the invention when it is put on the head.

While the housing 10 for the right ear is shown in FIG. 3, FIG. 4, and FIG. 5, that for the left ear, not shown, is provided symmetrical to that for the right ear.

FIG. 4 shows a state of a headphone with its window hole 28 shut by a lid member 32, while FIG. 5 shows the same put on the head 60 of a listener, with the lid member 32 removed from the window hole 28.

The housing 10 is formed of a cover 29, made of a synthetic resin in the shape of a dome, and a baffle plate 19 fixed on the inside of the cover 29, and a drive unit 20 is adapted to be supported on the baffle plate 19.

Inner space of the housing 10 is divided by the baffle plate 19 and the drive unit 20 in two chambers, a front chamber 10a and a rear chamber 10b.

The drive unit 20 is formed of a magnetic circuit 20a connected with the end of the cord 15 to be supplied with the audio signal therethrough and a diaphragm 20b in the shape of a dome to be driven by the signal passed through the magnetic circuit 20a.

In the side wall portion of the baffle plate 19, there is formed a through hole 21 and an acoustic resistance material 22 such as felt is attached to the through whole 21 so as to cover it.

An ear pad 23 in the shape of an oval ring is attached to the circumference of a sound emitting opening 25 of the front chamber 10a of the housing 10 as shown in FIG. 3. More specifically, the ear pad 23 formed of a cushion material 23a such as urethane and a protecting cover 23b of synthetic leather with no permeability enclosing the cushion material 23a is attached to a flange portion provided on the circumference of the sound emitting opening 25 integrally formed with the baffle plate 19.

When the headphone is put on the head 60 of a listener as shown in FIG. 5, the ear pad 23 is tightly pressed on the head 60 by the resilience of the head band 14 and the flexibility of the ear pad 23 ensures that no sound leaks out therethrough.

There is formed the window hole 28 of a circular form in the housing cover 29 in a position virtually confronted with the rear side of the drive unit 20. At the peripheral portion of the window hole 28, there is formed a screwed groove portion 29a, and at its bottom end, there are formed, integrally with the housing cover 29, a flange portion 29b and a cylindrical portion 29c projecting inward and perpendicularly to the flange portion 29b. At the cylindrical portion 29c, there is provided a second diaphragm 30 fixed by a fixing ring 31 to cover the window hole 28.

The second diaphragm 30 is smaller in diameter than the diaphragm 20b and is not provided with a drive unit.

Reference numeral 27 denotes a net attached to the baffle plate 19 in confronting relationship with the diaphragm 20b for mechanically protecting the diaphragm 20b. Reference numeral 34 denotes a net attached to the flange portion 29b for protecting the diaphragm 30.

The window hole 28 is adapted to be opened and shut by a lid member 32. More specifically, the lid member 32 is integrally provided with a cylindrical lip 33 on its periphery and the cylindrical lip 33 is provided with a screwed portion 33a on its outer wall, and the screwed portion 33a is adapted to be threaded with the screw grooves 29a. Accordingly, it is possible both to shut the window hole 28 with the lid member 32 as shown in FIG. 4 and to remove the lid member 32 from the window hole 28 as shown in FIG. 5.

Figure 6:
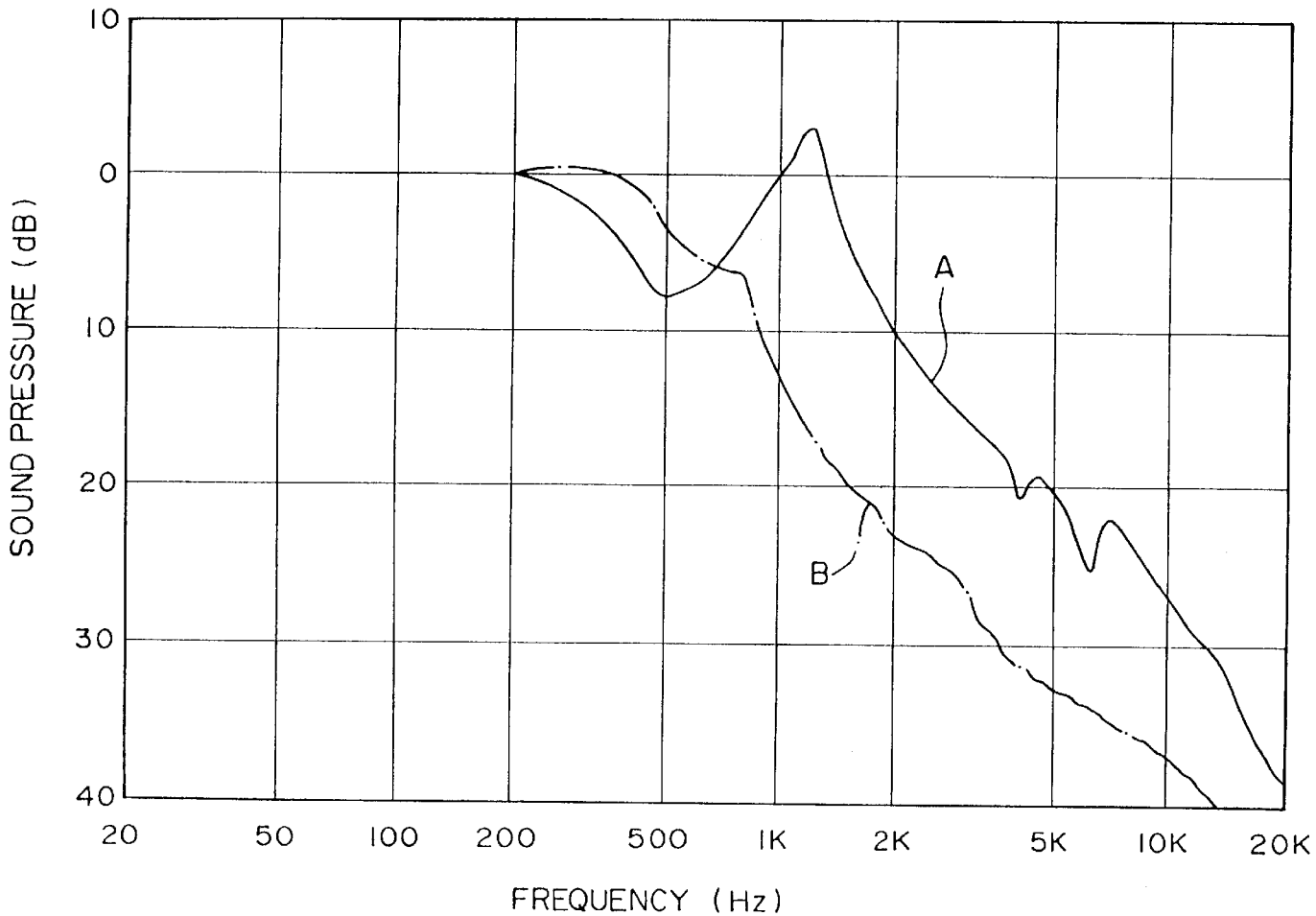
FIG. 6 shows characteristic curves of external sound to the embodiment of the invention.
Figure 7:
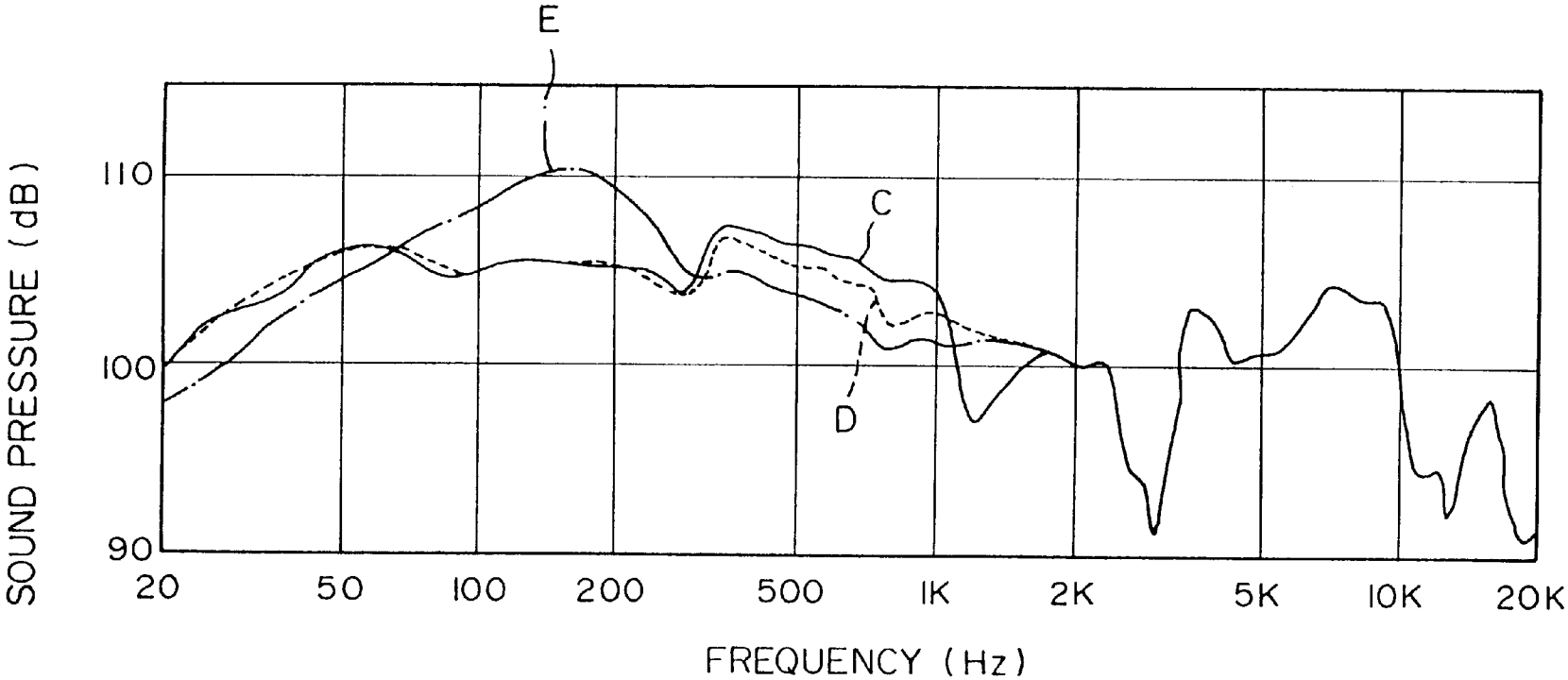
FIG. 7 shows characteristic curves of reproduced sound in the embodiment of the invention.

The transmission characteristics (frequency-sound pressure characteristics) of medium- and high-pitched external sound when the lid member 32 is removed from the window hole 28, and when the window hole 28 is shut by the lid member 32, of the headphone of the present embodiment are obtained as shown in FIG. 6. More specifically, the characteristic of the sound transmitted to the ear from outside the housing 10 when the lid member 32 was removed from the window hole 28 (in the state shown in FIG. 5) was obtained as shown by the curve A, and the characteristic when the window hole 28 was shut by the lid member 32 (in the state shown in FIG. 4) was obtained as shown by the curve B. Namely, it is known that, when the lid member 32 is removed from the window hole 28, the external sound in the range higher than 800 Hz is heard better than when the window hole 28 is shut with the lid member 32. In this case, the resonance frequency of the diaphragm was around 1300 Hz. Further, the frequency characteristics (frequency-sound pressure characteristics) of the reproduced sound by the headphone were obtained as shown in FIG. 7, i.e., the frequency characteristic when the lid member 32 was removed from the window hole 28 was obtained as indicated by the characteristic curve C and that when the window hole 28 was shut by the lid member 32 was obtained as indicated by the characteristic curve D. In this case, the characteristics are virtually the same though there is some difference between them in the range from 300 Hz to 1.8 KHz. For reference, a reproducing characteristic by the headphone was measured in the state of the headphone having the lid member 32 removed from the window hole 28 and, further, having the diaphragm 30 removed from the cylindrical portion 29c, and a characteristic as indicated by the curve E was obtained. According to this curve, while the sound pressure was lowered in the range lower than 60 Hz, damping around f0, the lowest resonance frequency (about 180 Hz), was not sufficient and the sound was greatly increased around there, and thus, the balance in the entire range was bad.

The characteristic curves in FIG. 6 and FIG. 7 were obtained by performing measurement with an artificial human head used and a sound concentrating microphone disposed in the position corresponding to the tympanic membrane of the ear.

From the above, it is known that, by using the headphone of the present embodiment and listening to the reproduced sound by this headphone with its lid member 32 removed from the window hole 28, a totally well-balanced sound, not attenuated in the low-pitched sound range, can be perceived and external sounds can also be heard. Therefore, the user can hear reproduced sound of music and the like while playing sports outdoors or taking a walk. Since, at this time, he can hear somebody calling him or the sound of the car horn, he can use the headphone with safety.

The headphone of the present embodiment can also be used as a general closed type headphone by using it with the window hole 28 closed by shutting it with the lid member 32. In this case, attenuation of the sound in the low-pitched sound range does not become so great and totally well-balanced sound can be heard, while the external sound is scarcely heard. Therefore, the listener can personally enjoy a reproduced sound at home not disturbed by the external sound.

When the headphone is used in a train or bus, a sound leaking out of the headphone is annoying to other passengers. At such an occasion, if the present headphone is used as a closed-type headphone, the sound from the headphone hardly leaks out and, hence, other passengers are not annoyed by a leaking sound. Thus, the present headphone can be easily changed to the closed-type headphone according to the need.

Figure 8:
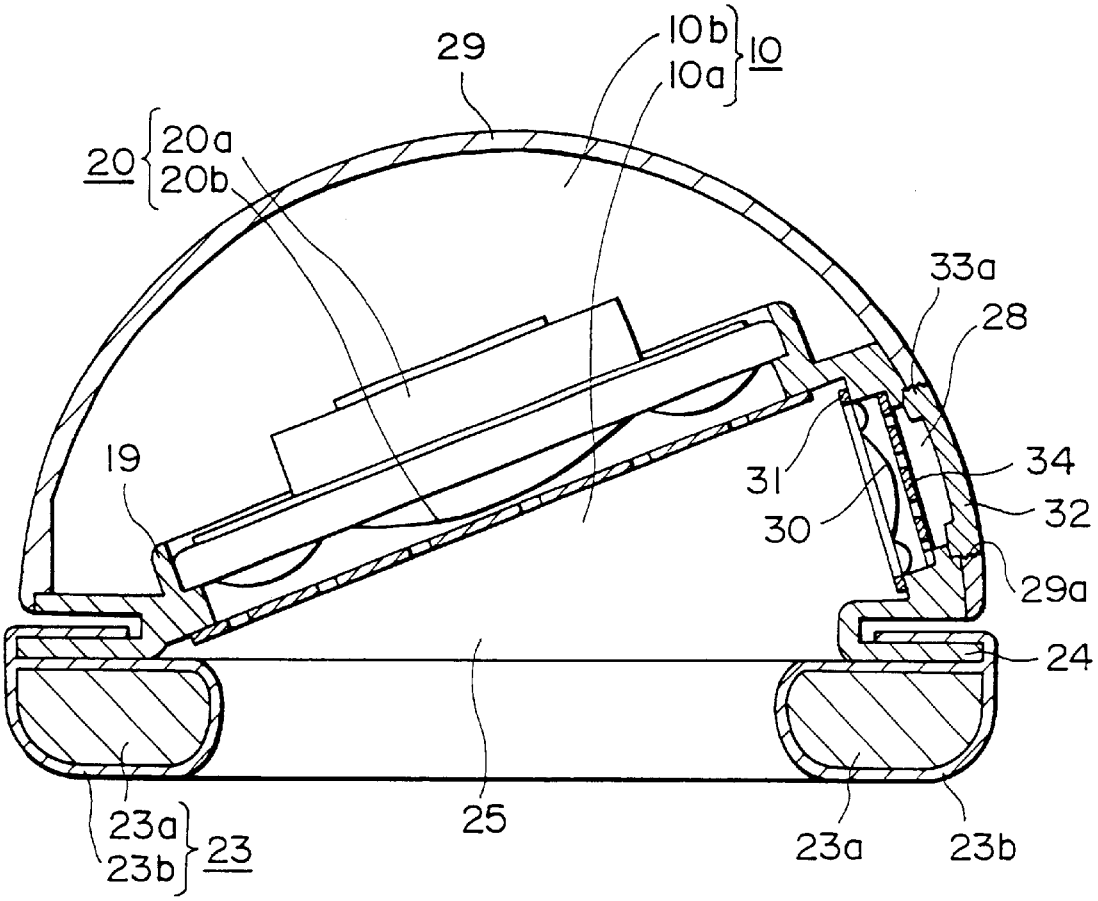
FIG. 8 is a sectional view, corresponding to FIG. 4, with the principal portion of another embodiment of the invention enlarged.

FIG. 8 is a diagram, corresponding to FIG. 4, showing a second embodiment of the invention. In FIG. 8, a second diaphragm 30 is provided at the portion of the baffle plate 19, where the through hole 21 and acoustic resistance member 22 were provided in FIG. 4, and a window hole 28, together with a removable lid member 32, is formed at the portion of the housing 29 confronted with the rear side of the second diaphragm 30. Also from this second embodiment, characteristics similar to those obtained from the first embodiment could be obtained.

What is claimed is:

1. A headphone comprising:

a housing;

a drive unit contained in said housing;

a first window hole formed in said housing;

a first diaphragm attached to said drive unit and covering said first window hole, whereby acoustic transmissibility between an inside space of said housing and an outside space thereof is provided, wherein said inside space of said housing is divided by partition means including said drive unit and said first diaphragm into a front chamber having a sound emitting opening and a rear chamber and wherein a section of said housing enclosing said front chamber has a second window hole formed therein connecting the front chamber with an exterior of said housing, a second diaphragm covering said second window hole; and said second window hole being operatively provided with a lid member for opening and shutting said second window hole, whereby said second window hole can be shut by a user of said headphone.

*2. A headphone comprising:*

*a housing having an opening at an end thereof for communicating with an ear of a user;*

*a baffle plate mounted within the housing for dividing the housing into a front acoustic chamber and a rear acoustic chamber;*

*an active diaphragm mounted on the baffle plate and having a drive unit; and*

*a passive diaphragm mounted over a window hole of the rear acoustic chamber of the housing, wherein the active diaphragm is provided between the opening and the passive diaphragm and is respectively spaced apart therefrom such that the active diaphragm substantially overlaps the passive diaphragm.*

*3. A headphone according to claim 2, wherein the window hole is provided with a lid member for opening and shutting the window hole by action of the user.*

*4. A headphone according to claim 2, wherein the baffle plate has a through hole therein through which the front acoustic chamber and the rear acoustic chamber are in communication.*

*5. A headphone according to claim 4, wherein the through hole is covered by an acoustic resistance member.*

* * * * *